Aug. 19, 1930.  C. J. ZINKE ET AL  1,773,333
WEIGHING SCALE
Filed Oct. 18, 1926  3 Sheets-Sheet 1
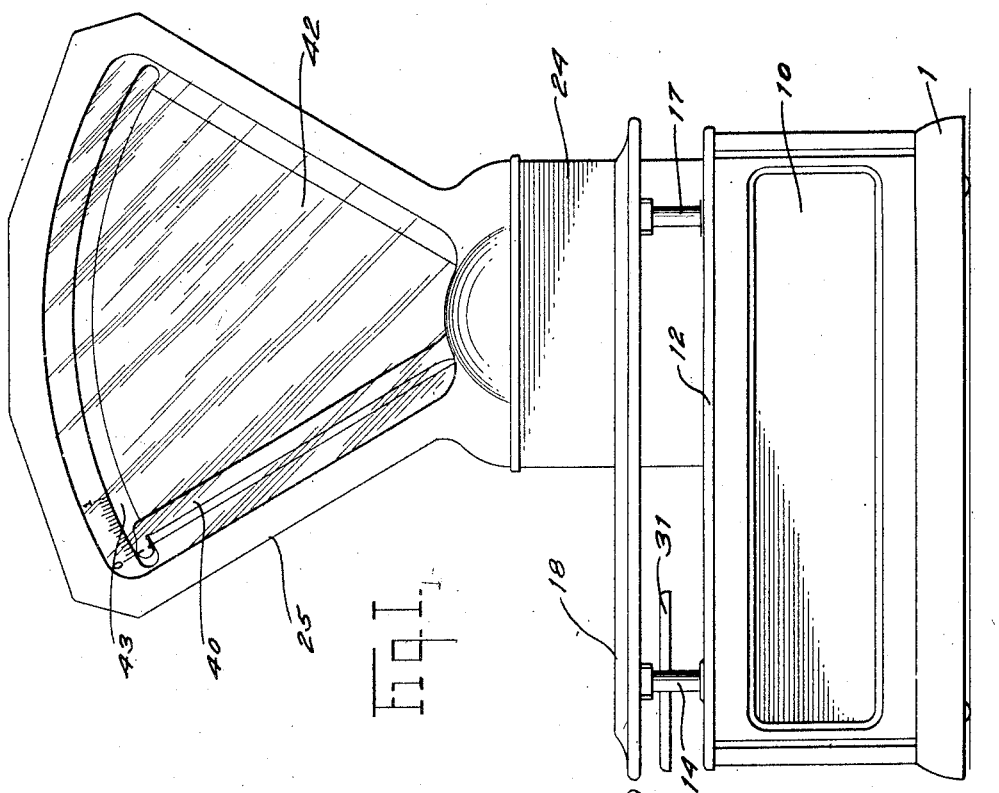
Fig. 1.
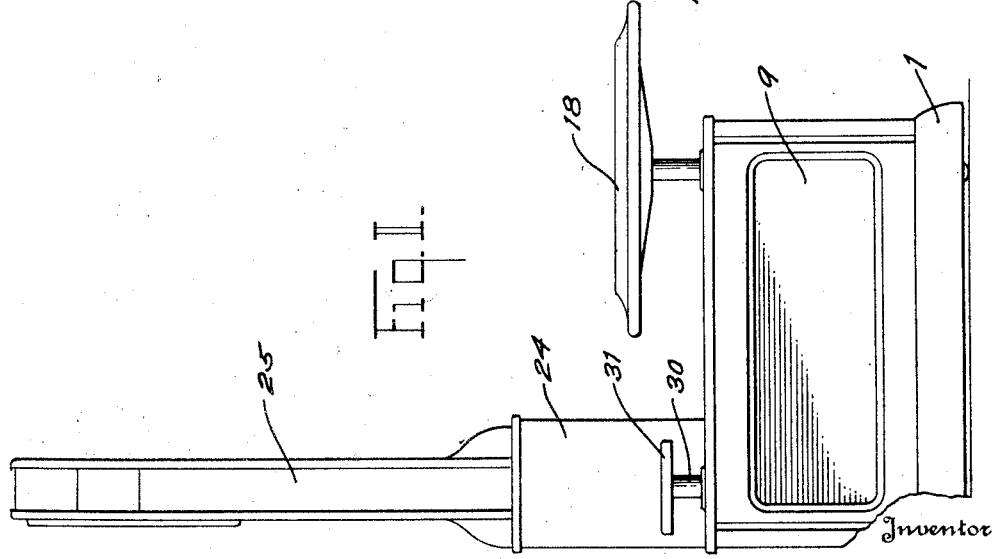
Fig. I.
Inventor
Carl J. Zinke.
Orwell C. Reeves.
By E. M. Marshall.
Attorney

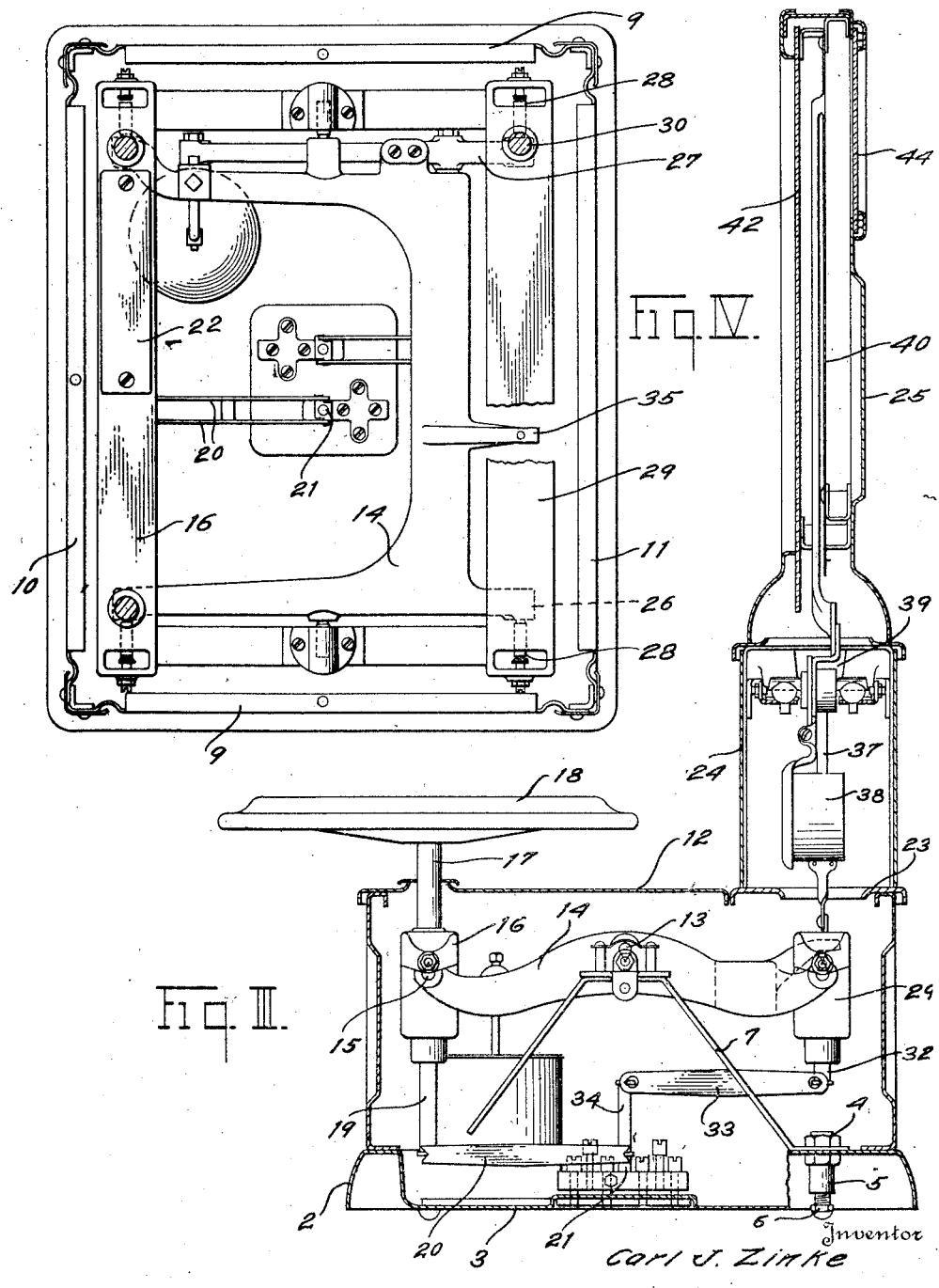

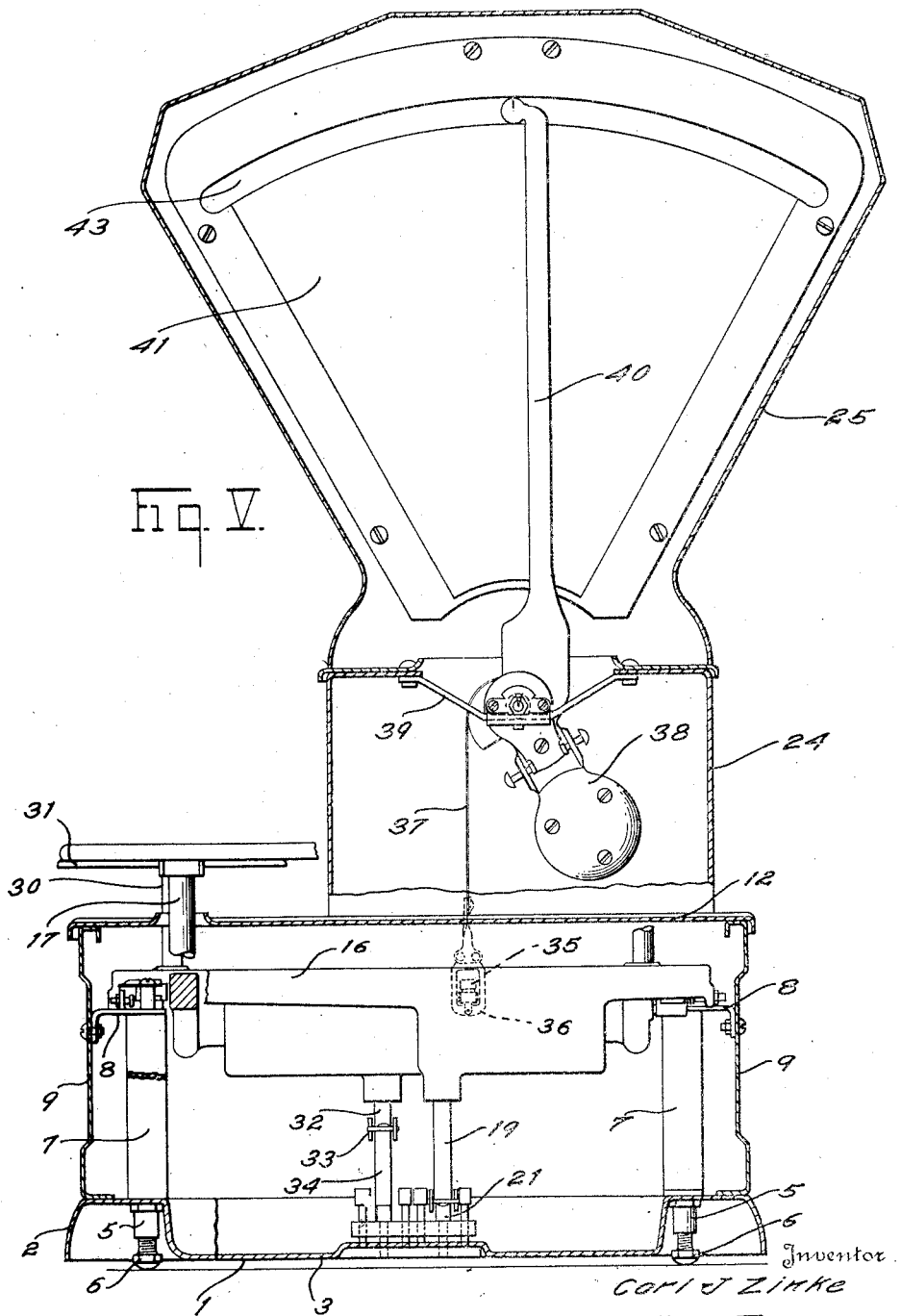

Patented Aug. 19, 1930

1,773,333

UNITED STATES PATENT OFFICE

CARL J. ZINKE AND ORWELL C. REEVES, OF TOLEDO, OHIO, ASSIGNORS TO TOLEDO SCALE COMPANY, OF TOLEDO, OHIO, A CORPORATION OF NEW JERSEY

WEIGHING SCALE

Application filed October 18, 1926. Serial No. 142,185.

This invention relates to weighing scales, and one of its principal objects is the provision of a weighing scale having great sensitiveness and at the same time capable of weighing comparatively heavy loads.

Another object is the provision of a scale in which the arrangement of the commodity-receiver and indicator is such as to facilitate the reading of weights and computations.

Another object is the provision of an automatic pendulum scale capable of weighing light loads with great accuracy but nevertheless having a comparatively heavy and stable automatic load counterbalance.

Another object is the provision of a scale of this type capable of being manufactured largely from sheet metal.

Another object is the provision of a scale which is economical to manufacture, light in weight and at the same time of rigid and sturdy construction.

Other objects and advantages will be apparent from the following description, in which reference is had to the accompanying drawings illustrating a preferred embodiment of the invention and wherein similar reference numerals designate similar parts throughout the several views.

In the drawings:—

Figure I is a front elevational view of a scale embodying our invention;

Figure II is a side elevation thereof;

Figure III is an enlarged side sectional view of the scale;

Figure IV is an enlarged plan view of the base and platform lever mechanism; and Figure V is an enlarged front elevational view, parts broken away and parts shown in section.

The base 1 of the scale is stamped from sheet metal having a downturned edge 2, which adds to its strength and enhances its appearance, and a depressed central portion 3. Secured to the base 1 by means of nuts 4 are studs 5 into which are threaded leveling screws 6 by means of which the condition of level of the scale may be adjusted. The studs 5 and nuts 4 also serve as securing means for fulcrum stands 7, preferably formed of strap metal, which rise from the base at each side. The fulcrum stands 7 are additionally secured in place by means of brackets 8 which are in turn secured to side plates 9 supported upon the base 1.

The side plates 9 with front and rear plates 10 and 11 and a cover plate 12 serve to house the platform lever mechanism.

Mounted by means of fulcrum pivots 13 upon the fulcrum stands 7 is the main lever 14 of the scale. This lever, as is shown in Figure IV, is substantially U-shaped in plan, its load pivots 15 being located substantially at the ends of the arms of the U. Carried by the load pivots 15 is a spider 16 from which rise posts 17 that extend upwardly through the cover plate 12 and support the commodity-receiving platter 18. In order to maintain the condition of level of the platter throughout weighing movements the spider 16 is provided with a downwardly extending spider stem 19 which is connected by means of check links 20 to a shift post 21 adjustably mounted on the base 1. A receptacle for loading is provided in the spider 16 and is covered by a plate 22.

Overlying the base housing adjacent its rear edge is a deck 23 upon which is mounted a small cabinet 24 surmounted by a fan-shaped housing 25, the cabinet and fan-shaped housing being arranged to support the load-counterbalancing and indicating mechanism of the scale.

Extending rearwardly from the main lever 14 are a short integral arm 26 and an adjustable arm 27. The arms 26 and 27 are provided with load pivots 28 upon which is mounted a second spider 29, and a post 30 is fixed upon the spider 29 and extends upwardly through the opening in the deck 23 supporting upon its upper end a weight-receiving pan 31. The spider 29 is also provided with a downwardly extending spider stem 32 which is connected by means of a shift link 33 to a shift post 34, the pivots supporting the lever 14, the spider 29 and the link 33 being arranged in parallelogrammatic relation, so that the condition of level of the pan 31 is maintained throughout weighing movements of the scale.

The main lever 14 is also provided with a rearward extension 35 which carries a nose pivot, the nose pivot being connected by means of a stirrup 36 and a flexible metallic ribbon 37 to a load-counterbalancing pendulum 38. The pendulum 38 in the form of device illustrated is supported on self-aligning bearings mounted upon a bracket 39 secured within the cabinet 24, while an indicator hand 40 rigidly connected with the pendulum 38 extends upwardly into the fan-shaped housing 25 where it co-operates with a fan-shaped chart 41, the chart and hand being visible through a window 42 from a position in front of the platform 18 and the tip of the hand which swings in an arcuate slot 43 being visible from the rear of the scale through a smaller window 44.

The pendulum 38 is of the so-called falling type. It is swung to the right in its position of greatest elevation when the commodity-receiving platform 18 is empty, being held in its elevated position by the weight of the spider 29, which is sufficient to over-balance the weight at the opposite end of the lever and hold the pendulum in elevated position. When a commodity is placed upon the commodity-receiving platform 18 it counterbalances a part of the weight of the spider 29, thus allowing the pendulum 38 to descend and swing the hand 40 over the chart.

It will be seen that the chart faces the scale operator standing in front of the platform. This arrangement is particularly desirable when the scale is to be used to weigh a succession of packages which pass over the platform from one side to the other and it is also desirable because with the chart directly behind the platform errors of parallax in reading the scale are avoided.

The main lever 14 in the scale shown is of the so-called even balance type—that is to say, a load on the commodity-receiving platform 18 will be exactly counterbalanced by an equal load on the pan 31. The lever, however, may be made of any desired multiplication and the counterweights to be used upon the pan 31 made accordingly.

With the arrangement shown the pendulum 38 may be relatively heavy, while the amount of movement of the indicator hand per ounce of change in weight of the load will be comparatively great. The capacity of the pendulum may, for example, be 5 lbs., so that very small changes in weight will be clearly indicated by the hand, while the total capacity of the scale is limited only by the strength of the parts and the amount of counterweight that can be piled on the pan 31.

The embodiment of our invention herein shown and described is to be regarded as illustrative only, and it is to be understood that the invention is susceptible to variation, modification and change within the spirit and scope of the subjoined claims.

Having described the invention, we claim:

1. In a weighing scale, in combination, a platform lever of the first order, a commodity-receiver supported by one end of said platform lever, a weight-receiver supported by the other end of said lever, an indicator facing said commodity-receiver, and means connecting said indicator to the end of said lever which supports said weight-receiver.

2. In a weighing scale, in combination, a commodity-receiver, an indicator facing said commodity-receiver, a weight-receiver located laterally of said indicator, and mechanism connecting said commodity-receiver, said indicator and said weight-receiver.

3. In a weighing scale, in combination, a lever of the first order, a commodity-receiver supported upon one end of said lever, a weight-receiver supported on the other end thereof, and indicating mechanism connected to the weight-receiver supporting end of said lever and facing said commodity-receiver.

4. In a weighing scale, in combination, a lever of the first order, a commodity-receiver supported on one end of said lever, an automatic load-counterbalance connected to the other end of said lever, the end of said lever connected to said load-counterbalance being over-weighted to hold said commodity-receiver in elevated position when empty, and an indicator connected to said load-counterbalance and facing said commodity-receiver.

5. In a weighing scale, in combination, a lever of the first order, a commodity-receiver supported on one end of said lever, an automatic load-counterbalance connected to the other end thereof, means for over-weighting the end of said lever connected to said counterbalance and thereby holding said commodity-receiver in elevated position when empty, and a weight-receiver supported by the over-weighted end of said lever.

6. In a weighing scale, in combination, a lever of the first order, a commodity-receiver supported on one end of said lever, an automatic load-counterbalance connected to the other end thereof, means for over-weighting the end of said lever connected to said counterbalance and thereby holding said commodity-receiver in elevated position when empty, a weight-receiver supported by the over-weighted end of said lever, and an indicator connected to said load-counterbalancing mechanism and facing said commodity-receiver.

7. In a weighing scale, in combination, a lever of the first order, said lever being substantially U-shaped in plan, a commodity-receiver supported at the ends of the arms of said U-shaped lever, and an automatic load-counterbalance located substantially above the bight portion of said U-shaped lever connected to the bight portion of said U-shaped lever.

8. In a weighing scale, in combination, a lever of the first order, said lever being substantially U-shaped in plan, a commodity-receiver supported at the ends of the arms of said U-shaped lever, and an automatic load-counterbalance connected to the bight portion of said U-shaped lever and located thereabove, the bight portion of said U-shaped lever being weighted to normally hold said commodity-receiver in elevated position.

CARL J. ZINKE.
ORWELL C. REEVES.